Figure 6:
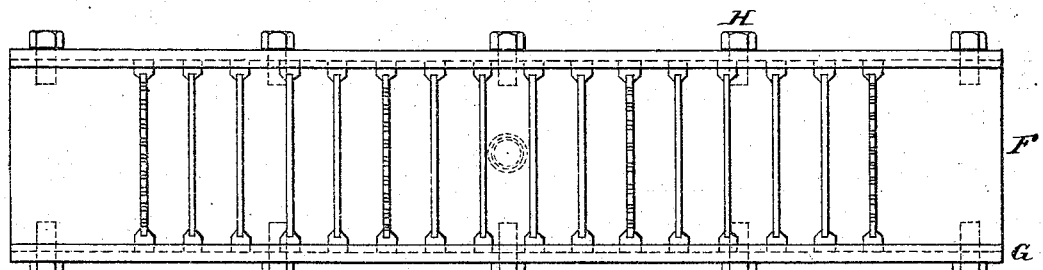

C. P. Seitzinger's
Improved Wire Crimping or Crinkling Machine.

No. 118283

Patented Aug 22 1871

Witnesses.
Victor Poch
F. C. Snover

Inventor.
C. P. Seitzinger

AM. PHOTO-LITHOGRAPHIC CO. N.Y. (OSBORNE'S PROCESS.)

118,283

UNITED STATES PATENT OFFICE.

CHARLES P. SEITZINGER, OF SCRANTON, PENNSYLVANIA.

IMPROVEMENT IN APPARATUS FOR CRIMPING WIRES.

Specification forming part of Letters Patent No. 118,283, dated August 22, 1871.

*To all whom it may concern:*

Be it known that I, CHARLES P. SEITZINGER, of the city of Scranton, in the county of Luzerne and State of Pennsylvania, have invented certain improvements in crimping or crinkling-machines for crimping or crinkling square or round iron or wire on the edge before it is woven for fences, railing, coal-screens, and iron or wire-cloth, of which the following is a specification:

The first part of my invention relates to the combination of two (2) iron blocks twenty-eight (28) inches long, more or less, four (4) inches wide, more or less, with thirty-three (33) iron (or its equivalent) teeth or slats, more or less, some of them beveled and smooth, others beveled and notched, and fastened on each block with screws or otherwise, that the teeth or slats can be moved together or moved apart, so as to make all sized meshes with the same teeth or slats and blocks. The second part of my invention relates to the combination, as follows: The upper block having four (4) notched teeth or slats, more or less, with nine (9) notches each, more or less, the under block having five (5) notched teeth or slats, more or less, with nine (9) notches each, more or less. The notched teeth or slats are raised in the blocks above the smooth teeth or slats so as to hold the square iron or wire firm and in its place while crimping or crinkling it. The side plates are grooved and hold the teeth or slats in their proper places in the upper and under blocks, and are fastened with screws or otherwise in the sides of the blocks.

Figure 5:
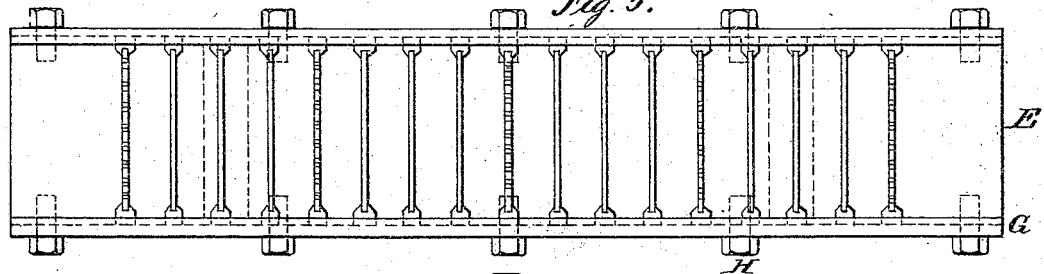
Figure 1:
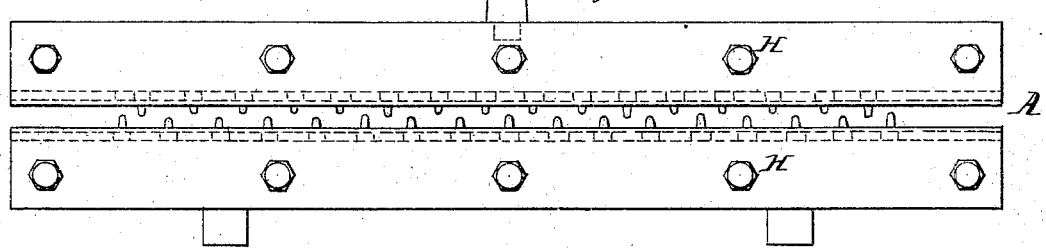
Figure 2:
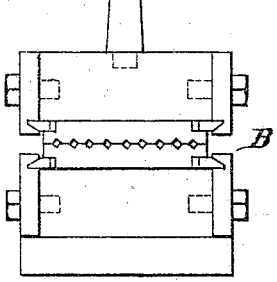
Figure 4:
Figure 3:

Figure 1 is a side view of a machine embodying my invention. Fig. 2 is an end view of the machine. Fig. 3 are notched teeth or slats. Fig. 4 are plain teeth or slats. Fig. 5 is a face view of under block with teeth or slats, two grooved side plates, and ten screws. Fig. 6 is a face view of upper block with teeth or slats, two grooved side plates, and ten screws.

The two (2) iron blocks A in Fig. 1 are placed in a press, and with one motion of the lever the entire length of the iron or wire is crimped or crinkled, which is used as the filling or cross-iron or wire in making iron or wire-cloth before weaving for coal-screens, fences, or railing.

One set of blocks will crimp or crinkle more than thirty (30) different sizes and kinds of meshes.

The different sizes and kinds of meshes are made by moving the teeth or slats to their respective position in the grooved plates and there fastened with screws or otherwise to make the particular sized mesh required.

I claim as my invention—

The combination of the two (2) iron blocks A, the movable iron teeth or slats C and D, and the grooved plates G, fastened with screws H or otherwise, substantially as and for the purpose hereinbefore set forth.

C. P. SEITZINGER.

Witnesses:
   T. C. SNOVER,
   VICTOR KOCH.